US012737531B2

(12) United States Patent
Zhao et al.

(10) Patent No.: US 12,737,531 B2
(45) Date of Patent: Sep. 15, 2026

(54) SPEECH RECOGNITION TEXT PROCESSING METHOD AND APPARATUS, DEVICE, STORAGE MEDIUM, AND PROGRAM PRODUCT

(71) Applicant: BEIJING SOGOU TECHNOLOGY DEVELOPMENT CO., LTD., Beijing (CN)

(72) Inventors: Ang Zhao, Beijing (CN); Jian Yu, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 99 days.

(21) Appl. No.: 18/199,712

(22) Filed: May 19, 2023

(65) Prior Publication Data

US 2023/0289514 A1 Sep. 14, 2023

Related U.S. Application Data

(63) Continuation of application No. PCT/CN2022/118397, filed on Sep. 13, 2022.

(30) Foreign Application Priority Data

Oct. 28, 2021 (CN) ......................... 202111280226.8

(51) Int. Cl.
*G06F 40/166* (2020.01)
*G06F 18/214* (2023.01)
(Continued)

(52) U.S. Cl.
CPC .......... *G06F 40/166* (2020.01); *G06F 18/214* (2023.01); *G06F 40/151* (2020.01);
(Continued)

(58) Field of Classification Search
CPC .... G06F 40/166; G06F 40/151; G06F 40/279; G06F 18/214; G06F 40/103;
(Continued)

(56) References Cited

U.S. PATENT DOCUMENTS 8,024,193 B2 * 9/2011 Bellegarda .............. G10L 13/06
704/260
10,388,272 B1 * 8/2019 Thomson ................ G10L 15/22
(Continued)

FOREIGN PATENT DOCUMENTS

CN 110674629 A 1/2020
CN 112509554 A 3/2021
(Continued)

OTHER PUBLICATIONS

Liu et al., "A Multi-level Hybrid Method for Dynamic Extraction and Normalization of Chinese Temporal Expressions," 2021 IEEE International Conference on Power, Intelligent Computing and Systems (ICPICS), Shenyang, China, 2021, pp. 498-503. (Year: 2021).*

(Continued)

*Primary Examiner* — Irete F Ehichioya
*Assistant Examiner* — Phoebe X Pan
(74) *Attorney, Agent, or Firm* — ArentFox Schiff LLP

(57) ABSTRACT

A speech recognition text processing method includes acquiring an original text obtained by speech recognition, and performing at least one of punctuation addition processing and numerical normalization processing on the original text to obtain an intermediate result. The method further includes performing word removal processing on the original text through an attention interaction layer based on the intermediate result to obtain a processed text of the original text.

18 Claims, 4 Drawing Sheets

(51) Int. Cl.

| | |
|---|---|
| ***G06F 40/151*** | (2020.01) |
| ***G06F 40/279*** | (2020.01) |
| ***G10L 15/16*** | (2006.01) |
| ***G10L 15/22*** | (2006.01) |
| ***G10L 15/26*** | (2006.01) |

(52) U.S. Cl.
CPC ............ *G06F 40/279* (2020.01); *G10L 15/22* (2013.01); *G10L 15/26* (2013.01); *G10L 15/16* (2013.01)

(58) Field of Classification Search
CPC ....... G06F 40/205; G10L 15/26; G10L 15/22; G10L 15/16; G06N 3/08
See application file for complete search history.

(56) References Cited

U.S. PATENT DOCUMENTS

| | | | | |
|---|---|---|---|---|
| 2002/0069059 | A1* | 6/2002 | Smith | G10L 15/193 704/E15.022 |
| 2003/0171926 | A1* | 9/2003 | Suresh | H04M 3/4938 704/270.1 |
| 2013/0054226 | A1* | 2/2013 | Chen | G06F 40/279 704/8 |
| 2018/0143956 | A1* | 5/2018 | Skarbovsky | G06F 40/166 |
| 2020/0160865 | A1* | 5/2020 | Michaely | G06F 40/151 |
| 2021/0375289 | A1* | 12/2021 | Zhu | G06F 40/253 |
| 2022/0139386 | A1* | 5/2022 | Li | G06F 40/53 704/9 |
| 2022/0261631 | A1* | 8/2022 | Cohen | G06N 20/00 |
| 2023/0107450 | A1* | 4/2023 | Chang | G10L 15/063 704/240 |

FOREIGN PATENT DOCUMENTS

| | | | | |
|---|---|---|---|---|
| CN | 112634876 A | | 4/2021 | |
| CN | 112712804 A | | 4/2021 | |
| CN | 112749531 A | | 5/2021 | |
| CN | 113468880 A | * | 10/2021 | G06F 40/166 |
| CN | 114154459 A | | 3/2022 | |

OTHER PUBLICATIONS

Yang et al., "Multi-Intent Text Classification Using Dual Channel Convolutional Neural Network," 2019 34rd Youth Academic Annual Conference of Chinese Association of Automation (YAC), Jinzhou, China, 2019, pp. 397-402. (Year: 2019).*

Joshi et al., "An end-to-end interpolated Automatic speech recognition system with punctuated transcripts for the Hindi language," 2021 6th International Conference on Computing, Communication and Security (ICCCS), Las Vegas, NV, USA, 2021, pp. 1-7. (Year: 2021).*

International Search Report and Written Opinion received for PCT Patent Application No. PCT/CN2022/118397, mailed on Oct. 27, 2022, With English Translation, 13 pages.

Lin et al., "Joint prediction of punctuation and disfluency in speech transcripts", Interspeech 2020, Shanghai, China, Available on internet at : www.interspeech2020.org/uploadfile/pdf/Mon-2-5-9.pdf, Oct. 29, 2020, pp. 716-720.

Office Action received for Chinese Patent Application No. 202111280226.8, mailed on Jan. 4, 2025, with English Translation, 34 pages.

* cited by examiner

SPEECH RECOGNITION TEXT PROCESSING METHOD AND APPARATUS, DEVICE, STORAGE MEDIUM, AND PROGRAM PRODUCT

RELATED APPLICATIONS

This application is a continuation of International Application No. PCT/CN2022/118397, filed on Sep. 13, 2022, which claims priority to Chinese Patent Application No. 202111280226.8, filed on Oct. 28, 2021. The disclosures of the prior applications are hereby incorporated by reference in their entirety.

FIELD OF THE TECHNOLOGY

This application relates to the field of computer technologies, including a speech recognition text processing method and apparatus, an electronic device, and a storage medium.

BACKGROUND OF THE DISCLOSURE

A speech recognition technology is to perform recognition processing on speech signals to obtain corresponding texts. In the related art, the readability of texts directly output by speech recognition is poor.

SUMMARY

Embodiments of this disclosure can improve the readability of a text obtained by speech recognition by providing a speech recognition text processing method and apparatus, an electronic device, a computer storage medium, and a computer program product.

In an embodiment, a speech recognition text processing method includes acquiring an original text obtained by speech recognition, and performing at least one of punctuation addition processing and numerical normalization processing on the original text to obtain an intermediate result. The method further includes performing word removal processing on the original text through an attention interaction layer based on the intermediate result to obtain a processed text of the original text.

In an embodiment, a speech recognition text processing apparatus includes processing circuitry configured to acquire an original text obtained by speech recognition, and perform at least one of punctuation addition processing and numerical normalization processing on the original text to obtain an intermediate result. The processing circuitry is further configured to perform word removal processing on the original text through an attention interaction layer based on the intermediate result to obtain a processed text of the original text.

In an embodiment, a non-transitory computer-readable storage medium stores computer-readable instructions thereon, which, when executed by processing circuitry, cause the processing circuitry to perform a speech recognition text processing method that includes acquiring an original text obtained by speech recognition, and performing at least one of punctuation addition processing and numerical normalization processing on the original text to obtain an intermediate result. The method further includes performing word removal processing on the original text through an attention interaction layer based on the intermediate result to obtain a processed text of the original text.

The embodiments of this disclosure have the following beneficial effects.

After the original text output by the speech recognition is acquired, preset processing is performed on the original text to obtain a preset processing result, the preset processing including at least one of the following processing: punctuation addition processing and digital normalization processing; and text smooth (word removal) processing is performed on the original text through an attention mechanism based on the preset processing result to obtain a processed text of the original text. In this way, through the attention mechanism, the text smooth processing is interacted with at least one of the punctuation addition processing and the digital normalization processing, which can make full use of the preset processing result during text smooth processing, increase the data diversity of text smooth processing, and further improve the accuracy of speech recognition text processing.

DESCRIPTION OF EMBODIMENTS

Embodiments of this disclosure are described below in conjunction with the drawings of this disclosure. It is to be understood that the embodiments described below in conjunction with the attached drawings are exemplary descriptions for explaining the technical solutions of the embodiments of this disclosure, and do not limit the technical solutions of the embodiments of this disclosure.

The following description refers to "some embodiments", which describe a subset of all possible embodiments, but it is understood that "some embodiments" may be the same subset or different subsets of all possible embodiments, and may be combined with each other without conflict.

In the following description, the term "first\ second\ third" is only used to distinguish similar objects, and does not represent a specific ordering of the objects. It is understood that "first\ second\ third" can be interchanged in a specific order or sequence if permitted, so that the embodiments of the disclosure described here can be implemented in other orders than those illustrated or described here.

This disclosure can improve the readability of a text obtained by speech recognition by providing a speech recognition text processing method and apparatus, an electronic device, a computer storage medium, and a computer program product, which is described as follows.

Figures 1, 2:
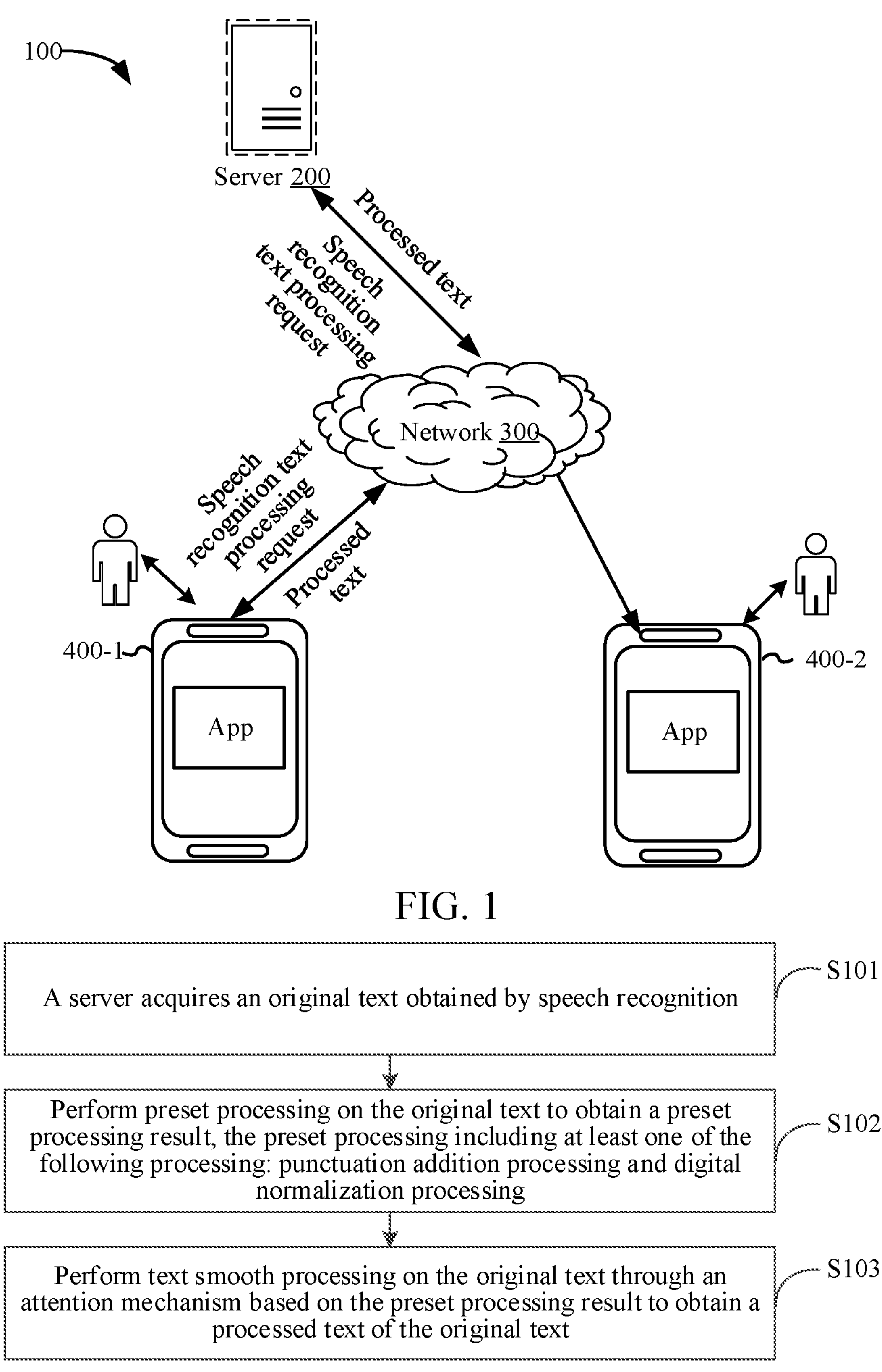
FIG. 1 is a schematic architecture diagram of a speech recognition text processing system 100 provided by an embodiment of this disclosure.
FIG. 2 is a flowchart of a speech recognition text processing method provided by an embodiment of this disclosure.

Firstly, a speech recognition text processing system provided by an embodiment of this disclosure will be described. Referring to FIG. 1, which is a schematic architecture diagram of a speech recognition text processing system 100 provided by an embodiment of this disclosure. To support an exemplary application, a terminal 400 (terminal 4001 and terminal 400-2 are exemplarily shown) is connected to a server 200 through a network 300, which can be a wide area network or a local area network, or a combination of the two, and data transmission is implemented by using wireless or wired links.

A terminal 400-1 is configured to send a speech recognition text processing request to a server 200.

A server 200 is configured to analyze the speech recognition text processing request in response to the speech recognition text processing request to obtain the original text obtained, through speech recognition, carried by the speech recognition text processing request.

Preset processing is performed on the original text to obtain a preset processing result, the preset processing including at least one of the following processing: punctuation addition processing and digital normalization processing (numerical normalization processing). Text smooth processing is performed on the original text through an attention mechanism based on the preset processing result to obtain a processed text of the original text. The processed text of the original text is returned to the terminal 400-1.

The terminal 400-1 is further configured to receive the processed text of the original text returned by the server 200, and display the processed text of the original text for viewing by the user.

Here, a server (such as the server 200) can be an independent physical server, can also be a server cluster or a distributed system composed of a plurality of physical servers, and can also be a cloud server providing basic cloud computing services such as a cloud service, a cloud database, cloud computing, cloud function, cloud storage, a network service, cloud communication, a middleware service, a domain name service, a security service, a content delivery network (CDN), and a large data and an artificial intelligence platform. Terminals (such as terminal 400-1 and terminal 400-2) can be smart phones, tablet computers, notebook computers, desktop computers, intelligent speech interaction devices (such as smart speakers), smart home appliances (such as smart TVs), smart watches, vehicle-mounted terminals and the like, but not limited to this. The terminal and the server may be directly or indirectly connected through wired or wireless communication, and the embodiments of this disclosure does not limit this.

Applying the above-mentioned embodiments of this disclosure, the information interaction of text smooth processing and punctuation addition processing and digital (numerical) normalization processing based on attention mechanism, or the information interaction of text smooth processing and punctuation addition processing based on attention mechanism, or the information interaction of text smooth processing and digital normalization processing based on attention mechanism, can make full use of the feature information of punctuation addition processing and/or the feature information of digital normalization processing during text smooth processing, increase the data diversity of text smooth processing, and further improve the accuracy of speech recognition text processing.

Referring to FIG. 2, which is a flowchart of a speech recognition text processing method provided by an embodiment of this disclosure. In some embodiments, the speech recognition text processing method provided by the embodiment of this disclosure can be implemented by a server or a terminal alone, or by a server and a terminal in cooperation. Taking the server implementation as an example, the speech recognition text processing method includes:

Step S101. A server acquires an original text obtained by speech recognition.

Step S102. Perform preset processing on the original text to obtain a preset processing result, the preset processing including at least one of the following processing: punctuation addition processing and digital normalization processing. For example, at least one of punctuation addition processing and numerical normalization processing is performed on the original text to obtain an intermediate result.

Here, when the preset processing is punctuation addition processing, the preset processing result is a punctuation addition processing result; and when the preset processing is digital normalization processing, the preset processing result is a digital normalization processing result.

Step S103. Perform text smooth processing on the original text through an attention mechanism based on the preset processing result to obtain a processed text of the original text. For example, word removal processing is performed on the original text through an attention interaction layer based on the intermediate result to obtain a processed text of the original text.

The method provided by the embodiments of this disclosure can be applied to a terminal device, such as a smart phone and a tablet computer, can also be applied to a server which has established data interaction with the terminal device, and can also be applied to a system including the terminal device and the server, this is not limited here.

In step S101, the acquisition of the original text obtained by speech recognition can be implemented in various ways. For example, when the user uses the terminal device for speech recognition, the terminal device may be arranged with a speech receiver, such as a microphone. When the terminal device starts the speech recognition function, the speech receiver is in a working state and can capture speech signals sent by the user. After the user's speech signal is captured, the speech signal can be processed by the speech recognition model on the terminal device to obtain the corresponding original text. Of course, the speech signal can also be sent to the server so that the server can process the speech signal to obtain the corresponding original text, this is not limited here.

The original text output by speech recognition typically includes the following features.

1. The original text does not contain punctuations. Then, in the case of a large number of words in the original text, because there is no punctuation label, it is impossible to punctuate the original text quickly, which leads to an increase in reading difficulty.
2. The numbers in the original text are digital characters in a Chinese character form. For example, the original text of speech recognition is "in the spring of nineteen seventy-nine", in which the year is a digital in Chinese character form, which does not conform to the user's reading habits.
3. The original text has redundant (or extra) words. Due to users' language habits, there are often redundant words such as deixis, repetition and modal words in spoken language. In practical applications, in spoken language, there are often some deixis to connect the context, such as pronoun deixis "this" and "that"; and mood deixis "um", "ah" and "uh". In one embodiment, the original text of speech recognition is "Turn the book to that twenty-ninth page", where "that" is a redundant word. It can be seen that if there are more redundant words in the original text, it will increase the reading difficulty of users.

In some embodiments, in order to improve the user's reading experience and reduce the user's reading difficulty, the original text is performed preset processing and the text smooth processing. The preset processing includes at least one of a punctuation addition processing and a digital normalization processing. Appropriate punctuation can be added to the original text through punctuation addition processing. Digital characters in a Chinese character form can be transferred through digital normalization processing, such as being transferred to Arabic numerals. Redundant words in the original text can be filtered out through text smooth processing.

In the implementation process, punctuation addition processing and/or digital normalization processing on the original text can be implemented through step S102, and text smooth processing on the original text can be implemented through step S103. In some embodiments, in order to make the results of the text smooth processing more accurate, the attention interaction between the text smooth processing and the punctuation addition processing results and/or the digital normalization processing results can make full and effective use of the features of the punctuation addition processing and/or the digital normalization processing to increase the data diversity of the text smooth processing and thus improve the accuracy of the speech recognition text processing.

In some embodiments, the punctuation addition processing, digital normalization processing, and text smooth processing on the original text can be implemented by using a deep learning model. In one embodiment, for each of the above processing tasks, a single-task deep learning model can be established, and each model is used for executing a corresponding processing task. In another embodiment, a multi-task deep learning model may be constructed to implement multiple processing tasks simultaneously.

In practical applications, for the multi-task deep learning model, when preset processing only includes punctuation addition processing, a corresponding multi-task deep learning model includes a punctuation addition processing task and a text smooth processing task. When the preset processing only includes digital normalization processing, the corresponding multi-task deep learning model includes a digital normalization processing task and a text smooth processing task. When the preset processing includes punctuation addition processing and digital normalization processing, the corresponding multi-task deep learning model includes a punctuation addition processing task, a digital normalization processing task, and a text smooth processing task. The task of the multi-task deep learning model can be set according to actual needs, this is not limited here.

Of course, in addition to the processing way of the deep learning model, the processing of the original text can also be implemented in other ways, for example, for digital normalization processing, the original text can be matched with preset rules. For example, the year in the original text is determined by a preset year recognition rule and the determined year is transcribed into Arabic numerals, or the time in the original text is determined by a preset time recognition rule and the determined time is transcribed into Arabic numerals and the like.

In some embodiments, the punctuation addition processing may be implemented in the following ways: sequentially labeling the original text based on a preset punctuation label dictionary to obtain the punctuation addition processing result as the preset processing result. Digital normalization processing can be implemented in the following ways: sequentially labeling the original text based on a preset digital normalization label dictionary (preset number normalization label dictionary) to obtain the digital normalization processing result as the preset processing result.

In practical applications, the punctuation addition processing and the digital normalization processing can be implemented by models or by multi-task models. For convenience of explanation, in some embodiments, a multi-task model including punctuation addition processing task, digital normalization processing task and text smooth processing task is taken as an example to explain, that is, the preset processing includes punctuation addition processing and digital normalization processing. In an implementation process, punctuation addition processing, digital normalization processing, and text smooth processing are implemented through the trained preset text processing model. The preset text processing model may be a recurrent neural network (RNN), a bidirectional encoder representations from transformers (BERT) and the like.

Figure 3:
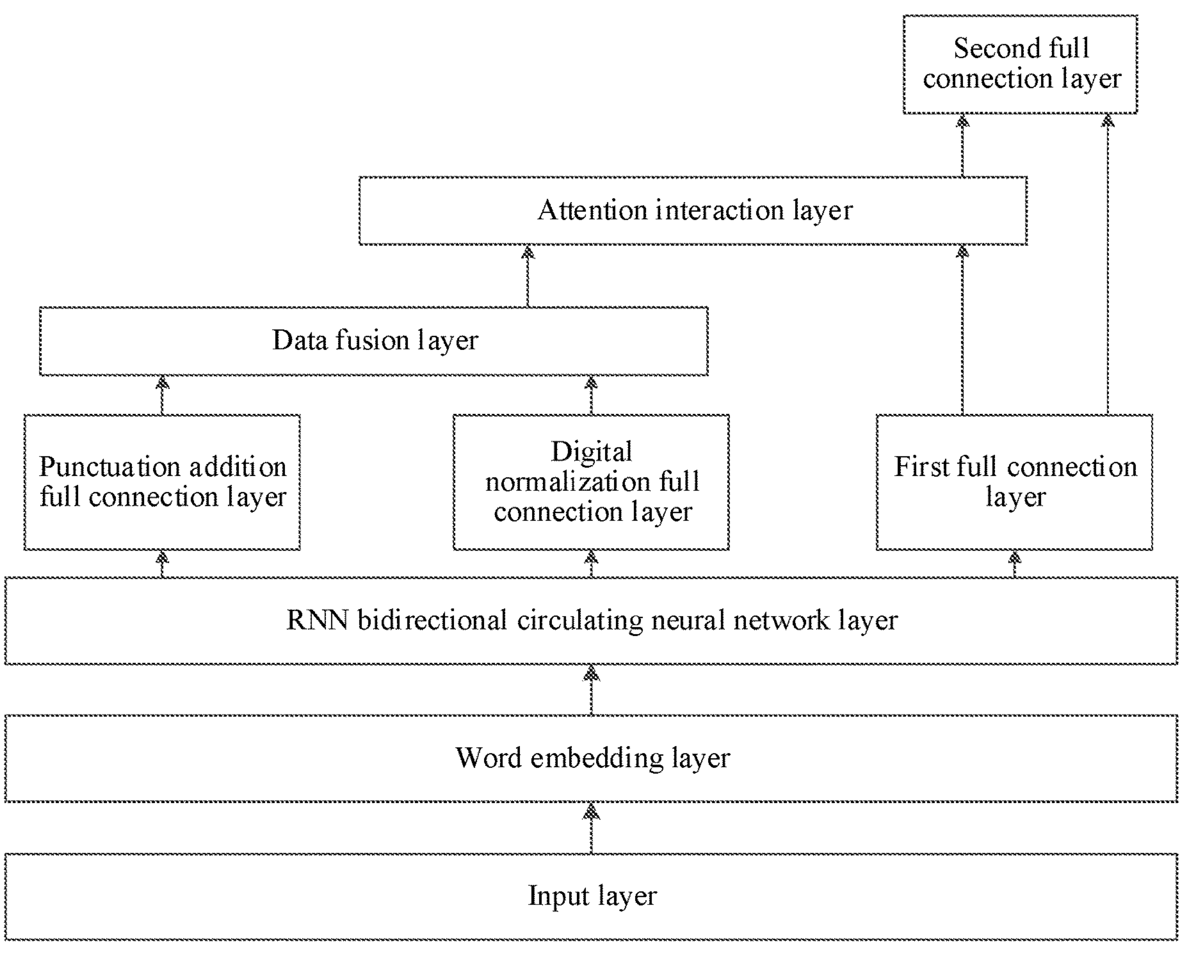
FIG. 3 is a schematic structural diagram of a preset text processing model provided by an embodiment of this disclosure.

As shown in FIG. 3, taking the preset text processing model as a RNN model as an example, it can include an input layer, a word embedding layer, a RNN bidirectional circulating neural network layer, and a full connection layer. The preset text processing model can be divided into a punctuation addition sub-model, a digital normalization sub-model, and a text smooth sub-model according to the task type. Different sub-models have full connection layers. As shown in FIG. 3, the punctuation addition sub-model is arranged with a punctuation addition full connection layer, the digital normalization sub-model is arranged with a digital normalization full connection layer, and the text smooth sub-model is arranged with a first full connection layer and a second full connection layer.

In some embodiments, step S102 may be implemented by the following steps. The original text is processed by a punctuation addition sub-model in the preset text processing model, that is, punctuations are added in the original text to obtain a text added with punctuations as a punctuation addition processing result. The original text is processed by a digital normalization sub-model in a preset text processing model, that is, the format of the numbers in the original text is converted into a target format (such as Arabic numbers), and the text after digital format conversion is obtained as a digital normalization processing result.

In practical applications, the punctuation addition sub-model can add punctuations to the inputted original text to obtain the text after punctuation addition, to automatically help users break sentences in the text converted from speech, reduce the reading difficulty of users and facilitate users to read.

When constructing a first training sample for training a punctuation sub-model, the first training sample carries a punctuation label, and the punctuation position in the original corpus can be recorded for the labeling of the punctuation label. Then, according to the punctuation label dictionary, the punctuation at the punctuation position is mapped to the corresponding punctuation label, and then the original corpus is labeled with punctuation sequence to obtain the first training sample carrying the punctuation label, and then the regional training sample is used to train the punctuation addition sub-model.

The use of punctuation label dictionary is explained here. Punctuation addition sub-model can automatically label the original corpus with punctuation labels according to the preset punctuation label dictionary. The preset punctuation label dictionary records the mapping relationship between punctuation and punctuation labels, which can be set according to actual needs. For example, the preset punctuation label dictionary can contain 6 labels, and the corresponding relationship between label serial number and label is {0: O"; 1: S-Douhao"; 2: S-Juhao"; 3: S-Wenhao"; 4: S-Tanhao"; 5: s-Blank" }, where "0" represents a non-punctuation character, "S-Douhao" represents a comma, "S-Juhao" represents a period, "S-Wenhao" represents a question label, "S-Tanhao" represents an exclamation label, and "S-Blank" represents a space.

For example, the input original corpus is "the year two thousand is also the Year of the Dragon, just one round away from nineteen ninety-eight", and the output punctuation label after the punctuation addition sub-model processing is TagPunc="O O O O S-Douhao O O O S-Douhao O O O O O O O O O S-Juhao", where the first "S-Douhao" in the punctuation label corresponds to the label of the character "year", representing that the next position of "year" is a comma; similarly, the second "S-Douhao" in the punctuation label corresponds to the label of the character "year", representing that the next position of "year" is a comma, and the "S-Juhao" in the punctuation label corresponds to the label of the character "round", representing that the next position of "round" is a period.

The punctuation addition processing result can be a final output result of the preset text processing model, or can be intermediate processing data of the preset text processing model. For example, as a punctuation addition processing result, data output by the full connection layer is added for punctuation in FIG. 2.

For the digital normalization sub-model, the digital normalization sub-model can convert the digitals in Chinese character form in the input original text into the target format, such as Arabic numerals, and output the processing results after digital conversion of the original text. In this way, the converted text is more consistent with the user's reading habits and improves the user's reading experience.

When constructing a second training sample for training a digital normalization sub-model, the second training sample carries a digital normalization label. In practical applications, the position of the digital segment in the original corpus is recorded for the labeling of the digital normalization label, and then the digits at the position of the digital segment are mapped into the desired digital normalization label by using the preset digital normalization label dictionary, and then the original corpus is automatically labeled with the digital normalization label to obtain a second training sample carrying the digital normalization label, and then the digital regular sub-model is trained by using the second training sample. In this way, the dependence of labeling data is reduced and the cost of manual labeling is saved.

In practical applications, the preset digital normalization label dictionary can be set according to actual needs. For example, the preset digital normalization label dictionary can contain 3 labels, and the corresponding relationship between the label serial number and the label is {0: "o"; 1: "B"; 2: "I"}, where "O" represents for non-numeric characters, "B" represents for the beginning of numbers, and "I" represents for the middle or end of numbers.

Still taking the original input corpus as "the year two thousand is also the Year of the Dragon, just one round away from nineteen ninety-eight" as an example, the digital normalization label output after being processed by the digital normalization sub-model is TagNum="B I I I O O O O O O B I I I O O O O O".

The digital normalization processing result can be a final output result of the preset text processing model, and can also be intermediate processing data of the preset text processing model. For example, the result of the digital normalization processing is data output by the digital normalization full connection layer.

In some embodiments, in order to perform text smooth processing on the original text, the preset text processing model may further include a text smooth sub-model. The text smooth sub-model can identify redundant words in the input original text and delete redundant words in the original text. In practical applications, the redundant words can be deixis, a repeated word, a modal word and the like. The demonstrator can be a pronoun demonstrator used for context cohesion in spoken language, such as "this" and "that"; modal words such as "um", "ah" and "uh". In this way, the readability and continuity of the text after the text smooth processing can be improved, and the recognition text can be more written.

When constructing the third training sample for training the text smooth sub-model, manual labeling can be performed based on manual experience, and the pre-smooth text including smooth words (redundant words) is sequentially labeled by using the preset text smooth label dictionary (preset word removal label dictionary) to output text smooth labels (word removal labels). A preset text smooth label dictionary can be set according to actual needs. In some embodiments, the preset text smooth label dictionary can contain 2 labels, and the corresponding relationship between the label serial number and the label is {0: "O"; 1: "I"}, where "0" represents non-redundant characters and "I" represents redundant characters.

For example, the input original text is "turn the book to that twenty-ninth page", and the text smooth label processed by the text smooth sub-model is TagDisf="O O O O O I I O O O O O". The character "that" corresponding to two consecutive "I" is a redundant word.

In some embodiments, in order to implement the information interaction between the text smooth processing, punctuation addition processing and digital normalization processing, increase the data diversity of the text smooth processing and improve the accuracy of the text smooth processing, the original text is performed text smooth processing by adopting the attention mechanism based on the punctuation addition processing result and the digital normalization processing result by executing step S103.

During implementation, step S103 can be implemented by the following steps: fusing the punctuation addition processing result and the digital normalization processing result to obtain fused data; and performing text smooth processing on the original text through an attention mechanism based on the fused data to obtain a text smooth processing result as a processed text of the original text.

In practical applications, the fusion of the punctuation addition processing result and the digital normalization processing result can be implemented inside the preset text processing model. Referring to FIG. 3, the preset text processing model includes a data fusion layer, through which the punctuation addition processing result and the digital normalization processing result are fused to obtain fused data. In some embodiments, the fused data may be obtained by the following formula.

$$ipc_i = \tan h(w_{ipc} \times [i_i, p_i] b_{ipc})$$

The data fusion layer can be regarded as a combination of data splicing, full connection layer and activation output, where $ipc_i$ is an activation output of the fused data, $i_i$ is an output of digital normalization processing, $p_i$ is an output of punctuation addition processing, $w_{ipc}$ is a linear connection weight corresponding to the data fusion layer, $b_{ipc}$ is a linear connection paranoia corresponding to the data fusion layer, and a subscript i is a word position index of the original text.

After obtaining the fused data, based on the attention mechanism, the original text can be performed text smooth processing in the following ways: performing text smooth feature extraction (or word removal feature extraction) on the original text to obtain a text smooth feature (or word removal feature); performing attention interaction on the fused data and the text smooth feature to obtain an interaction feature; and determining a text smooth processing result based on the interaction feature and the text smooth feature.

In some embodiments, based on the interaction features and the text smooth features, the text smooth processing result can be determined by the following ways: splicing the interaction feature and the text smooth feature to obtain a splicing feature; and decoding the splicing feature to obtain a text smooth processing result.

In practical applications, the original text is processed by a text smooth sub-model in a preset text processing model to obtain text smooth features; attention interaction is performed on the fused data and the text smooth feature through the preset text processing model to obtain an interaction feature; and a text smooth processing result is determined based on the interaction feature and the text smooth feature.

As shown in FIG. 3, in order to implement the information interaction between the text smooth processing and the fused data, the preset text processing model is arranged with an attention interaction layer, which is configured to calculate the attention mechanism of the fused data and the text smooth features, and output the interaction features. In addition, two full connection layers are arranged in the text smooth sub-model: a first full connection layer and a second full-connection layer. The first full connection layer is configured to perform text smooth feature extraction on an original text and output text smooth features, and the second full connection layer is configured to process the text smooth features and interaction features. In some embodiments, the interaction features may be obtained by the following formula:

$$f_j=\Sigma_i ipc_i$$

where $f_j$ is interaction feature data, $a_i$ is attention weight, $ipc_i$ is the activation output of the fused data, and a subscript i is a word position index of the original text.

In some embodiments, the attention weight may be calculated by the following formula:

$$a_i=\frac{\exp(ipc_i^T d_j)}{\sum_{k\in n}\exp(ipc_k^T d_j)}$$

where $d_j$ is the $j^{th}$ text smooth feature output by the first full connection layer, and k is a subscript of the position where a word is located in a sentence.

After the interaction features are obtained, the interaction features and the text smooth features output by the first full connection layer are processed through the second full connection layer of the text smooth sub-model. For example, the second full connection layer can be connected with the softmax layer, and the text smooth processing result is finally output through the softmax layer. In practical applications, the interaction features and the text smooth features output by the first full connection layer can be fused by the second full connection layer, and the fusion results can be classified by the softmax layer to output the text smooth processing results. In some embodiments, the text smooth processing results may be obtained by the following formula:

$$d_i(\text{final})=\text{soft max}(w_c\times[f_i,d_i,]+b_c)$$

where $f_i$ is an attention interaction feature, $d_i$ is a text smooth feature, $w_c$ is a linear connection weight corresponding to text smooth processing, and $b_c$ is a linear connection bias term corresponding to text smooth processing.

In practical applications, after obtaining the punctuation addition processing result, the digital normalization processing result and the text smooth processing result, step S104 can be executed to determine the processed text of the original text.

The training of the preset text processing model is described herein. The preset text processing model needs to use training data labeled with labels in the training process, where the labels can include text smooth labels (word removal labels), punctuation labels and digital normalization labels (numerical normalization labels) according to actual needs. Generally speaking, the labeling of training data depends on manual labeling. When a large amount of training data is needed for model training, the cost of manual labeling will inevitably be higher. To reduce dependence on manual labeling, training data carrying labels can be constructed by automatic labeling.

In practical applications, the preset text processing model can be obtained in the following ways: constructing training data carrying labels of a preset text processing model; and training the initial text processing model based on the training data to obtain a trained text processing model as the above preset text processing model.

In some embodiments, the preset text processing model may be a multi-task model, and correspondingly, the label of the training data includes a label under each task, taking the label of the training data including a punctuation label, a digital normalization label and a text smooth label as an example. The construction way of the training data carrying the three labels will now be described below.

Firstly, the construction of training data and corresponding punctuation labels includes: acquiring a first corpus text; filtering punctuations in the first corpus text to obtain the training data; and sequentially labeling the training data based on a punctuation type and a punctuation position of each punctuation in the first corpus text and a preset punctuation label dictionary to obtain the punctuation labels of the training data.

Here, training data and corresponding punctuation labels are constructed, that is, training data carrying punctuation labels is constructed. In practical applications, the filtered first corpus text is obtained by filtering punctuation in the first corpus text. Based on the punctuation type, punctuation position and preset punctuation label dictionary of each punctuation in the first corpus text, the filtered first corpus text is sequentially labeled to obtain the first corpus text carrying punctuation labels as training data carrying punctuation labels.

Corpus for constructing training data can be selected as needed, for example, open corpus texts available on the network can be used to construct training data. In practical applications, after the open corpus text is acquired, the open corpus text can be preliminarily processed, including but not limited to keeping Chinese characters, English, numbers and target type punctuation in the open corpus text (such as keeping punctuation included in the preset punctuation label dictionary), converting to lowercase, converting from full angle to half angle and the like, removing the remaining characters, and taking the processed open corpus text as the first corpus text.

For example, the acquired open corpus text is S0:

S0="in addition, according to the "A Daily" report, 2013 was the best year for the stock labelet in country B since 1995".

S0 is subjected to the above preliminary processing. The preset punctuation label dictionary follows the above example, that is, the comma, period, question label and exclamation label are reserved, and the rest label symbols are removed, and the first corpus text S1 obtained is:

S1="in addition, according to the "A Daily" report, 2013 was the best year for the stock labelet in country B since 1995".

The training data is constructed based on S1. In practical applications, the punctuation in S1 can be filtered to construct the training data. Of course, in addition to filtering out punctuation, S1 can also be processed in other ways. In some embodiments, because the preset text processing model is a multi-task model that implements punctuation addition processing, digital normalization processing and text smooth processing. Therefore, when constructing training data, the numbers in a non-Chinese character form in S1 can also be converted into a Chinese character form to obtain training data S2:

S2="in addition, according to the "A Daily" report, twenty thirteen was the best year for the stock labelet in country B since nineteen ninety-five".

In some embodiments, when constructing punctuation labels of training data, it is necessary to record the type and position of each punctuation in S1, for example, the word "report" is followed by a comma, and the last word "year" is followed by a period. Then, according to the preset punctuation label dictionary, the punctuation label of S2 is constructed. Taking the preset punctuation label dictionary as an example, the constructed punctuation label of S2 is:

TagPunc="O O O O O O O O S-Douhao O O O O O O O O O O O O O O O O O O O O O O O O O S-Juhao".

The "S-Douhao" in the punctuation label corresponds to the label of the "report", representing that the next position of the "report" is a comma; and the label "S-Juhao" corresponds to "year", representing that the next position of "year" is the period.

Secondly, the construction of training data and corresponding digital normalization labels includes: acquiring a second corpus text; converting a digital in a non-Chinese character form in the second corpus text into a Chinese character form to obtain the training data; and sequentially labeling the training data based on a digital position in the non-Chinese character form in the second corpus text and a preset digital normalization label dictionary to obtain the digital normalization labels of the training data.

Here, the training data and the corresponding digital normalization label are constructed, that is, the training data carrying the digital normalization label is constructed. In practical applications, the digital format in the second corpus text (for example, speech numerical format) is converted into a target format (such as Arabic numerals or written numerical format), and the converted second corpus text is obtained. Based on the digital position in the second corpus text and the preset dictionary of digital normalization labels, the converted second corpus text is sequentially labeled to obtain training data with digital normalization labels.

The second corpus text can also be the text obtained through the preliminary processing of the open corpus. The preliminary processing process can refer to the above description when constructing punctuation labels, and will not be repeated here. Taking the open corpus text as the above S0 as an example, the obtained second corpus text can be the same as the above first corpus text, that is, the second corpus text is also S1.

Based on S1, the training data can be constructed. In practical applications, the digitals in non-Chinese character form in S1 can be converted into a Chinese character form to obtain the training data. Of course, in addition to converting the numbers in the non-Chinese character form, S1 can also be processed in other ways to obtain training data. In some embodiments, because the preset text processing model is a multi-task model that implements punctuation addition processing, digital normalization processing and text smooth processing. Therefore, when constructing training data, the punctuation in S1 can also be filtered to obtain the training data, namely above S2.

When constructing digital normalization labels, it is necessary to record the positions of digitals in non-Chinese character form in S2. For example, the word "report" is followed by four consecutive Arabic numerals, and the word "was" is followed by four consecutive Arabic numerals. Then, according to the preset digital normalization label dictionary, the digital normalization label of S2 is constructed. Following the example of the preset digital normalization label dictionary, the constructed digital normalization label of S2 is:

TagNum="O O O O O O O O O O B I I I O O B I I I O O O O O O O O O O O O O O O".

Thirdly, the construction of training data and corresponding text smooth labels includes: acquiring a third corpus text; determining, in the third corpus text, a target insertion position for inserting a redundant word; predicting a target redundant word (target extra word) inserted at the target insertion position based on a text located before the target insertion position in the third corpus text; inserting the target redundant word into the target insertion position to obtain the training data; and sequentially labeling the training data based on the target redundant word, the target insertion position, and a preset text smooth label dictionary to obtain the text smooth labels of the training data.

Here, the training data and the corresponding text smooth label are constructed, that is, the training data carrying the text smooth label is constructed. In practical applications, the target redundant words are inserted into the target insertion position in the third corpus text to obtain the inserted third corpus text. Based on the target redundant words, the target insertion position and the preset dictionary of text smooth labels, the inserted third corpus text is sequentially labeled to obtain training data with text smooth labels.

In practical applications, the third corpus text may also be a corpus obtained by preliminary processing of the open corpus text. In addition, when the preset text processing model is a multi-task model to implement punctuation addition processing, digital normalization processing and text smooth processing, in order to ensure that the constructed training data does not contain punctuations and digitals in non-Chinese character form, the third corpus text can also be a text that filters out punctuation and converts non-Chinese character form numbers into Chinese character form numbers. Of course, the third corpus text can also contain punctuations and digitals in non-Chinese character form. After inserting redundant words, the punctuation is filtered out and the digitals in non-Chinese character form are transformed, this is not limited here.

In order to construct the training data under the text smooth task, the training data needs to contain redundant words. In some embodiments, the target insertion position of inserting redundant words can be determined in the third corpus text first, and then the target redundant words can be generated and inserted into the target insertion position to construct the training data.

The determination of the target insertion position can be implemented in many ways, such as randomly selecting the target insertion position in the third corpus text, or determining the target insertion position through a trained position determination model, this is not limited here. The generation of target redundant words can also be implemented in many ways, such as generating target redundant words through N meta language model, or generating target redundant words through a neural network language model, this is not limited here.

In some embodiments, the description is made by taking a preset smooth position determination model (extra word position determination model) and a preset redundant word generation model as an example. The preset redundant word generation model may be a neural network language model based on transformer decoder. Then, the target insertion position can be determined by the following ways: inputting the third corpus text into a preset smooth position determination model to obtain the target insertion position. The target redundant word may be generated in the following ways: inputting the text located before the target insertion position in the third corpus text into a preset redundant word generation model to obtain the target redundant word.

In practical applications, the third corpus text S3="it will produce different meanings" is taken as an example. The third corpus text S3 is input into a preset smooth position determination model, the output target insertion position is located after "different", and the text before the target insertion position is determined, that is, "it will produce different", and the text is taken as the input of the preset redundant word generation model, and the target redundant word "meaning" is output.

The training data of the constructed text smooth task can be obtained by inserting the target redundant words into the target insertion position. That is, "it will produce different meanings", and the training data is serialized and labeled according to the preset text smooth label dictionary to obtain the text smooth tag. Still following the text smooth label dictionary above, the constructed text smooth label is TagDisf="O O O O O O O I I O O".

The target insertion position can be one or more. When there are multiple target insertion positions, the text before each target insertion position can be used as the input of the preset redundant word generation model in order to generate the target redundant words corresponding to each target insertion position. In addition, for a target insertion position, one or more target redundant words can also be generated, this is not limited here.

To sum up, the training data and labels under each task can be constructed through the above methods, and the initial text processing model can be trained through the training data and labels, so that the trained model can be obtained as the preset text processing model.

For the training data of the text smooth task, it is highly dependent on manual labeling. In some embodiments, the training data of the text smooth task can be automatically constructed through the preset smooth position determination model and the preset redundant word generation model. The training process of the preset smooth position determination model will be explained below.

For a preset smooth position determination model, its training data can be constructed from text labeled with text smooth labels. For example, the labeled text DO and the corresponding text smooth label are:

D0="this is actually a digital construction a process in recent years";

TagDisf="O O O O O O O O O O I I O O";

According to the text smoothness label, "a" after "construction" is a redundant word. If the redundant word is removed, the text without redundant words can be constructed as training data D1, where D1="this is actually a digital construction process in recent years". Correspondingly, the target insertion position of the training data is located after "construction". In this way, a large number of training data and the corresponding target insertion position of each training data can be constructed, and the trained model can be obtained by using the training data and the corresponding target insertion position for model training, which can be used as the preset smooth position determination model.

The above-mentioned construction processes of punctuation labels, digital normalization labels and text smooth labels can be combined with each other. For example, for an open corpus text, training data carrying punctuation labels, digital normalization labels, and text smooth labels can be constructed in the above-mentioned way. In one embodiment, an open corpus text is acquired. For example, the text of the open corpus text is still S0, and S0 is preliminarily processed to obtain the text S1. For the subsequent construction of punctuation labels and digital normalization labels, the type of each punctuation label, the position of each punctuation label and the digital positions in S1 can be recorded. Then, the punctuations in S1 are filtered out and the digitals in non-Chinese character form are converted into the Chinese character form to obtain the text S2. The text S2, as the third corpus text, is inputted into the preset smooth position determination model, and outputted the target insertion position, for example, the target insertion position is the position after "since". Then, the text before the target insertion position, that is, "in addition, according to "A Daily" report, twenty thirteen was . . . since nineteen ninety-five", is input into the preset redundant word generation model to generate the target redundant word "that", and it is inserted into the target insertion position to obtain training data "in addition, according to "A Daily" report, twenty thirteen was the best year for the stock labelet in country B since nineteen ninety-five" and generate text smooth labels.

Punctuation labels and digital normalization labels of training data "in addition, according to the "A Daily" report, twenty thirteen was the best year for the stock labelet in country B since nineteen ninety-five" are constructed. Because the target redundant words are inserted in S2, it is necessary to update the punctuation type, punctuation position and digit position recorded in S1 before based on the position and word number of the inserted target redundant words. The updated punctuation position and digital position are matched with the training data formed after inserting the target redundant words, and punctuation labels and digital normalization labels are constructed by using the updated punctuation type, punctuation position and digital position.

The above is explained by taking the preset processing as punctuation addition processing and digital normalization processing as examples. When the preset processing is punctuation addition processing or digital normalization processing, the structure of the preset text processing model can be adjusted accordingly, and the corresponding text processing method is similar to that described above, which will not be described in detail here.

To sum up, this embodiment of this disclosure introduces the multi-objective interaction of attention mechanism, and makes full use of the features of punctuation addition processing and/or digital normalization processing during outputting the results of text smooth processing, thus increasing the data diversity of text smooth processing; At the same time, when training the preset text processing model of multi-tasks, the disclosure can implement the automatic construction of training data and the automatic labeling of each task, thus saving the labor cost and improving the construction efficiency of training data.

Figure 4:
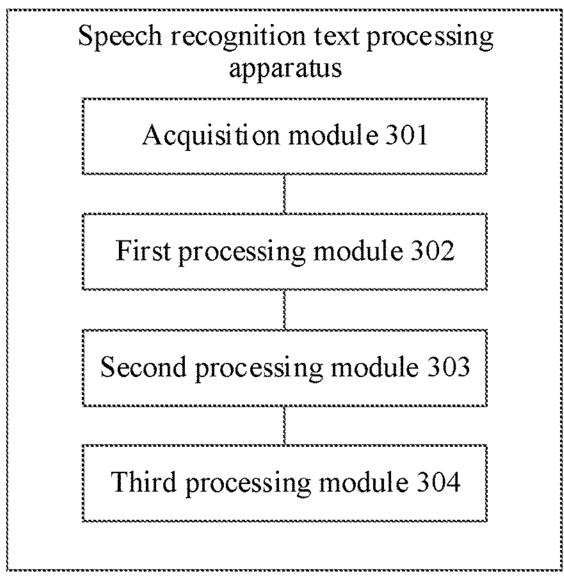
FIG. 4 is a schematic diagram of a speech recognition text processing apparatus provided by an embodiment of this disclosure.

An embodiment of this disclosure provides a speech recognition text processing apparatus. As shown in FIG. 4, the apparatus includes:

recognition;

an acquisition module 301, configured to acquire an original text obtained by speech a first processing module 302, configured to perform preset processing on the original text to obtain a preset processing result, the preset processing including at least one of the following processing: punctuation addition processing and digital normalization processing; and a second processing module 303, configured to perform text smooth processing on the original text through an attention mechanism based on the preset processing result to obtain a processed text of the original text.

In some embodiments, in a case that the preset processing includes punctuation addition processing and data normalization processing, the apparatus further includes:

a data fusion module, configured to fuse the punctuation addition processing result and the digital normalization processing result to obtain fused data; and a second processing module 303, configured to perform text smooth processing on the original text through an attention mechanism based on the fused data to obtain a processed text of the original text.

In some embodiments, in a case that the preset processing is punctuation addition processing, the first processing module 302 is configured to:

perform punctuation addition processing on the original text to obtain an original text added with punctuations as the preset processing result.

In some embodiments, in a case that the preset processing is digital normalization processing, the first processing module 302 is configured to:

convert a digital format in the original text into a target format by performing digital normalization processing on the original text to obtain a text after digital format conversion as the preset processing result.

In some embodiments, the second processing module 303 is configured to:

perform text smooth feature extraction on the original text to obtain a text smooth feature;

perform attention interaction on the fused data and the text smooth feature to obtain an interaction feature; and determine the processed text of the original text based on the interaction feature and the text smooth feature.

In some embodiments, the apparatus further includes:

a construction module, configured to construct training data of the preset text processing model, the training data carrying labels including text smooth labels, the labels further including at least one of punctuation labels and digital normalization labels; and a training module, configured to train an initial text processing model based on the training data to obtain the preset text processing model.

In some embodiments, when the training data carries a punctuation label, the construction module is configured to:

acquire a first corpus text;

filter punctuations in the first corpus text to obtain a first intermediate corpus text; and sequentially label the first intermediate corpus text based on a punctuation type and a punctuation position of each punctuation in the first corpus text and a preset punctuation label dictionary to obtain the training data carrying the punctuation labels.

In some embodiments, when the training data carries digital normalization labels, the construction module is configured to:

acquire a second corpus text;

convert a digital in a non-Chinese character form in the second corpus text into a Chinese character form to obtain a second intermediate corpus text; and sequentially label the second intermediate corpus text based on a digital position in the non-Chinese character form in the second corpus text and a preset digital normalization label dictionary to obtain the training data carrying the digital normalization labels.

In some embodiments, when the training data carries a text smooth label, the construction module is configured to:

acquire a third corpus text;

determine, in the third corpus text, a target insertion position for inserting a redundant word;

predict a target redundant word inserted at the target insertion position based on a text located before the target insertion position in the third corpus text;

insert the target redundant word into the target insertion position to obtain a third intermediate corpus text; and sequentially label the third intermediate corpus text based on the target redundant word, the target insertion position, and a preset text smooth label dictionary to obtain the training data carrying the text smooth labels.

In some embodiments, the construction module is configured to:

input the third corpus text into a preset smooth position determination model to obtain the target insertion position; and input the text located before the target insertion position in the third corpus text into a preset redundant word generation model to obtain the target redundant word.

Figure 5:
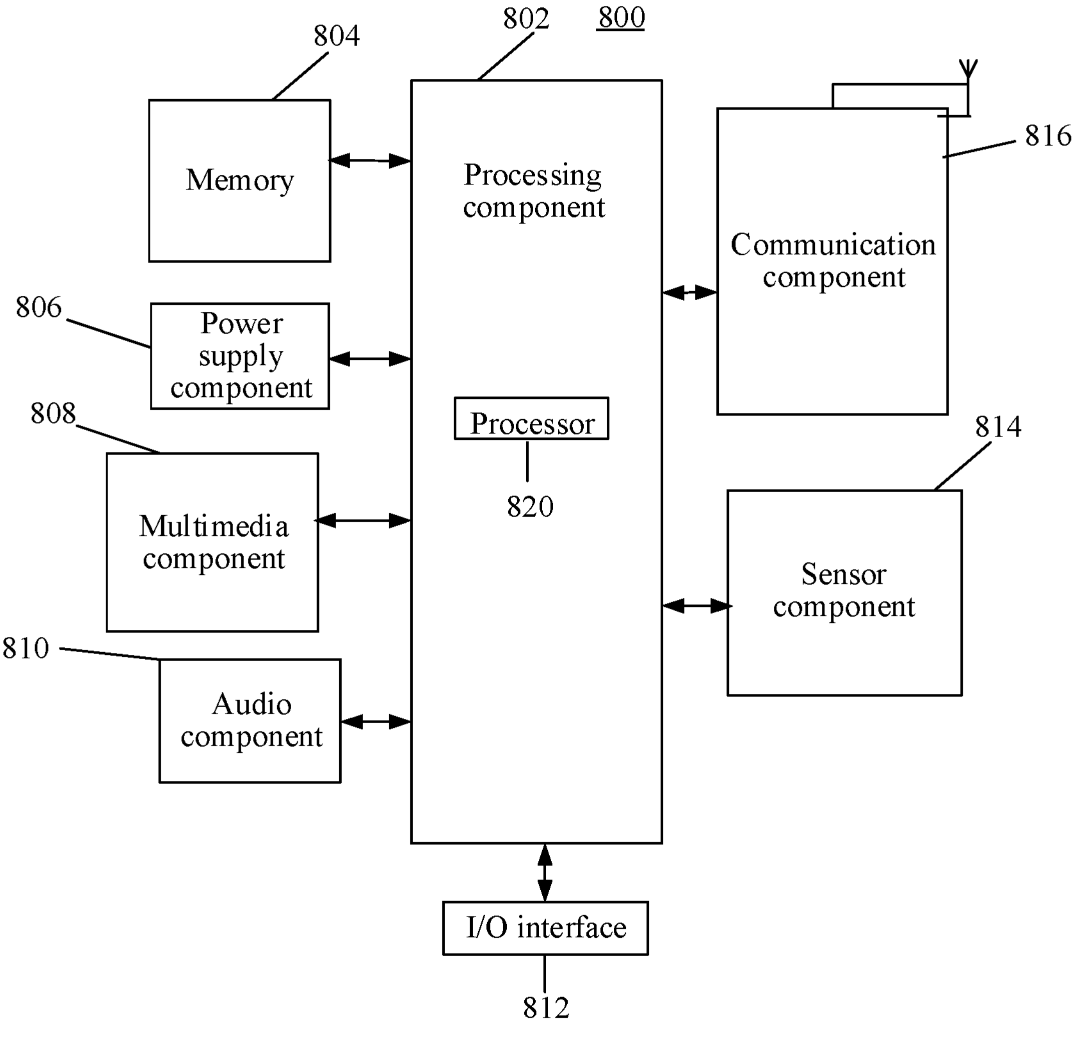
FIG. 5 is a schematic diagram of an electronic device provided by an embodiment of this disclosure.

An embodiment of this disclosure provides an electronic device 800 for implementing a speech recognition text processing method, and FIG. 5 is a block diagram of the electronic device 800 according to an exemplary embodiment. For example, the device 800 may be a mobile phone, a computer, a digital broadcast terminal, a messaging device, a game console, a tablet device, a medical device, an exercise device, a personal digital assistant and the like.

Referring to FIG. 5, the device 800 may include one or more of the following components: a processing component 802 (processing circuitry), a memory 804 (non-transitory computer-readable storage medium), a power supply component 806, a multimedia component 808, an audio component 810, an input/output (I/O) interface 812, a sensor component 814, and a communication component 816.

The processing component 802 generally controls overall operation of the device 800, such as operations associated with display, telephone calls, data communications, camera operations, and recording operations. The processing element 802 may include one or more processors 820 to execute instructions to complete all or part of the steps of the method described above. In addition, the processing component 802 may include one or more modules, to facilitate the interaction between the processing component 802 and other assemblies. For example, the processing component 802 can include a multimedia module to facilitate interaction between the multimedia component 808 and the processing component 802.

The memory 804 is configured to store various types of data to support operation at the device 800. Examples of these data include instructions for any application or method operating on the device 800, contact data, phone book data, messages, pictures, videos, and the like. The memory 804 may be implemented by any type or combination of volatile or non-volatile memory devices, such as Static Random Access Memory (SRAM), Electrically Erasable Programmable Read Only Memory (EEPROM), Erasable Programmable Read Only Memory (EPROM), Programmable Read-Only Memory (PROM), Read Only Memory (ROM), magnetic memory, flash memory, magnetic disk, or optical disks.

Power component 806 provides power to the various components of device 800. Power component 806 can include a power supply management system, one or more power supplies, and other components associated with generating, managing, and distributing power for device 800.

The multimedia component 808 includes a screen that provides an output interface between the device 800 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, slides, and gestures on the touch panel. Touch sensors may not only sense the boundaries of a touch or slide action, but also detect the duration and pressure associated with the touch or slide operation. In some embodiments, the multimedia component 808 includes a front camera and/or a rear camera. When the device 800 is in an operation mode, such as a shooting mode or a video mode, the front camera and/or the rear camera can receive external multimedia data. Each front camera and rear camera may be a fixed optical lens system or have a focal length and an optical zooming capability.

The audio component 810 is configured to output and/or input audio signals. For example, the audio component 810 includes a microphone (MIC) that is configured to receive external audio signals when the device 800 is in an operation mode, such as a call mode, a recording mode and a speech recognition mode. The received audio signal may be stored in the memory 804 or transmitted through the communication component 816. In some embodiments, the audio component 810 further includes a loudspeaker, configured to output an audio signal.

The I/O interface 812 provides an interface between the processing component 802 and an external interface module. The external interface module may be a keyboard, a click wheel, buttons, or the like. These buttons may include, but are not limited to, a home button, a volume button, a start button, and a lock button.

In an exemplary embodiment, the apparatus 800 may be implemented by one or more application specific integrated circuit (ASIC), digital signal processing (DSP), digital signal processing device (DSPD), programmable logic device (PLD), field programmable gate array (FPGA), controllers, micro-controllers, microprocessors, or other electronic components for performing the methods described above.

In an exemplary embodiment, a non-transitory computer-readable storage medium including instructions is further provided, for example, a memory 804 including instructions, which are executable by the processor 820 of the device 800 to complete the above method. For example, the non-transitory computer-readable storage medium may be an ROM, a random-access memory (RAM), a CD-ROM, a magnetic tape, a floppy disk, an optical data storage device and the like.

Figure 6:
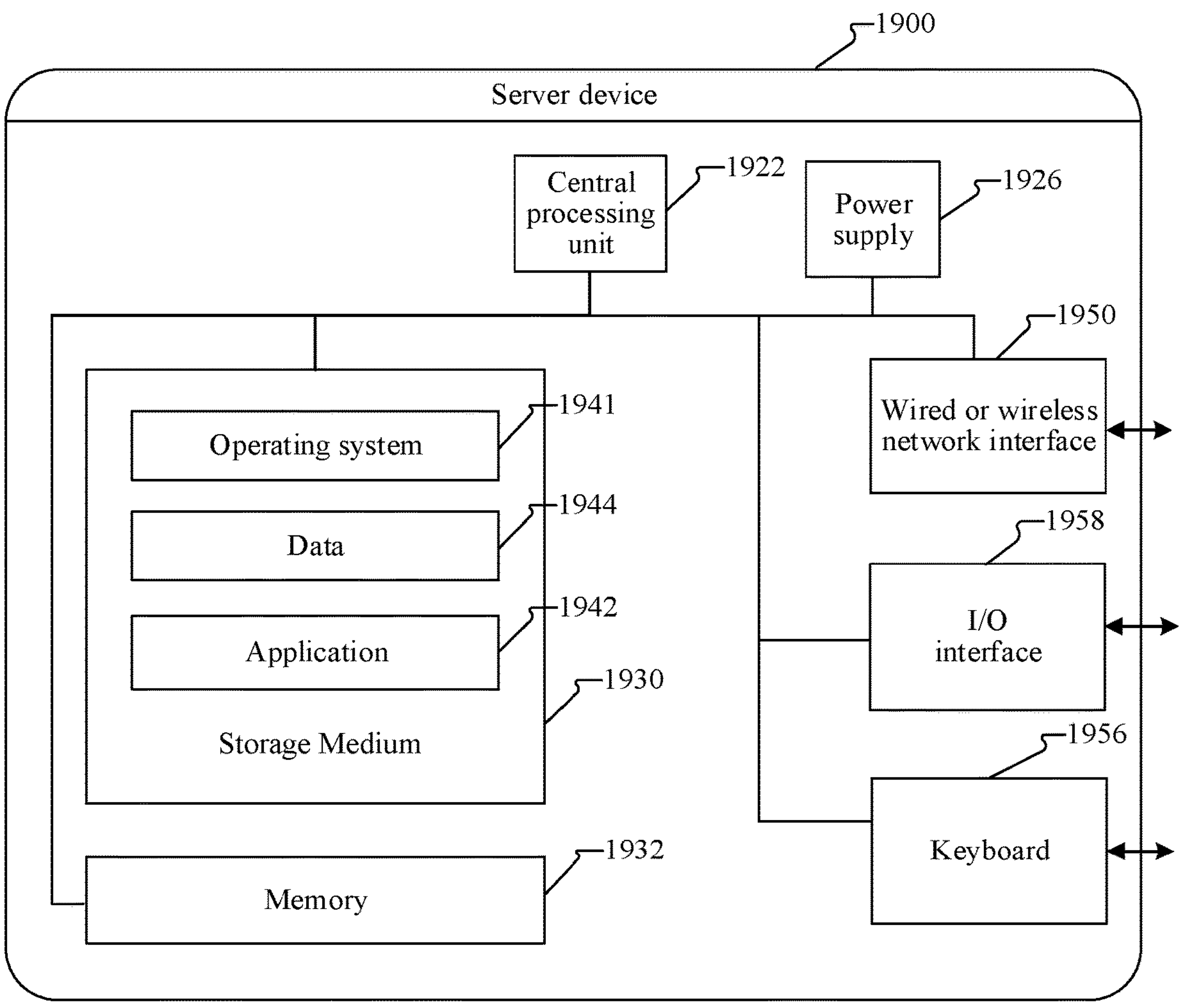
FIG. 6 is a schematic structural diagram of a server provided by an embodiment of this disclosure.

FIG. 6 is a schematic structural diagram of a server in some embodiments of this disclosure. The server 1900 may vary greatly due to different configurations or performances and may include one or more central processing units (CPU) 1922 (such as one or more processors) and memory 1932, one or more storage media 1930 (such as one or more mass storage devices) for storing applications 1942 or data 1944. Here, the memory 1932 and the storage medium 1930 may be transient storage or persistent storage. The program stored in the storage medium 1930 may include one or more modules (not shown), and each module may include a series of instruction operations on the server. The central processing unit 1922 can be arranged to communicate with the storage medium 1930 and execute a series of instruction operations in the storage medium 1930 on the server 1900.

The server (s) 1900 can also include one or more power supplies 1926, one or more wired or wireless network interfaces 1950, one or more input-output interfaces 1958, one or more keyboards 1956, and/or one or more operating systems 1941 such as Windows Server™, Mac OS X™, Unix™, Linux™, FreeBSD™ and the like.

A non-transitory computer-readable storage medium, when instructions in the storage medium are executed by a processor of an apparatus (server or terminal), causing the apparatus to perform the data processing methods of the foregoing embodiments.

A non-transitory computer-readable storage medium, when instructions in the storage medium are executed by a processor of an apparatus (server or terminal), causing the apparatus to perform the above speech recognition text processing method.

According to one or more technical solutions provided in the embodiments of this disclosure, at least the following technical effects or advantages are implemented.

The information interaction of text smooth processing and punctuation addition processing and digital normalization processing based on attention mechanism, or the information interaction of text smooth processing and punctuation addition processing based on attention mechanism, or the information interaction of text smooth processing and digital normalization processing based on attention mechanism, can make full use of the feature information of punctuation addition processing and/or the feature information of digital normalization processing during text smooth processing, increase the data diversity of text smooth processing, and further improve the accuracy of speech recognition text processing.

Those skilled in the art will readily think of other implementations of this disclosure after considering the specification and practicing the disclosure disclosed herein. This disclosure is intended to cover any variation, use, or adaptive change of this disclosure. These variations, uses, or adaptive changes follow the general principles of this disclosure and include common general knowledge or common technical means, which are not disclosed in the present disclosure, in the art. The specification and examples are to be regarded as exemplary only, with the true scope and spirit of the disclosure indicated by the following claims.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A speech recognition text processing method comprising:

acquiring a target corpus text;

determining, in the target corpus text, one or more insertion positions for inserting one or more extra words that are semantically redundant to the target corpus text;

obtaining a training corpus text that includes the one or more extra words inserted into the target corpus text at the one or more insertion positions;

obtaining a set of labels corresponding to the training corpus text, the set of labels including at least one or more word removal labels corresponding to the inserted one or more extra words;

training an initial text processing model based on the training corpus text and the set of labels to obtain a text processing model;

acquiring an original text obtained by speech recognition;

performing punctuation addition processing that is configured to add punctuation to the original text and numerical normalization processing that is configured to convert number words into numerals in the original text to determine a punctuation addition processing result and a numerical normalization processing result;

fusing the punctuation addition processing result and the numerical normalization processing result to obtain fused data;

performing, via the text processing model, word removal feature extraction on the original text based on an added punctuation of the punctuation addition processing and the numerals of the numerical normalization processing to determine a word removal feature, the word removal feature extraction being configured to identify at least one spoken word determined to be semantically redundant; and performing word removal processing on the original text through an attention interaction layer based on the word removal feature and the fused data to determine a processed text of the original text.

2. The method according to claim 1, wherein the performing the numerical normalization processing to convert number words into numerals in the original text comprises:

converting a speech numerical format in the original text into written numerical format.

3. The method according to claim 1, wherein the performing the word removal processing on the original text comprises:

performing attention interaction on the fused data and the word removal feature to determine an interaction feature; and generating the processed text of the original text based on the interaction feature and the word removal feature.

4. The method according to claim 1, further comprising:

filtering punctuations in the target corpus text to obtain a first intermediate corpus text; and sequentially labeling the first intermediate corpus text based on a punctuation type and a punctuation position of each punctuation in the target corpus text and based on a preset punctuation label dictionary to obtain punctuation labels to be included in the set of labels.

5. The method according to claim 1, further comprising:

converting a number in a numeric form in the target corpus text into a number word form to obtain a second intermediate corpus text; and sequentially labeling the second intermediate corpus text based on a position of the number in the numeric form in the target corpus text and based on a preset number normalization label dictionary to obtain numerical normalization labels to be included in the set of labels.

6. The method according to claim 1, further comprising:

predicting, for each of the one or more insertion positions, the respective one of the one or more extra words based on a text located before the respective insertion position in the target corpus text.

7. The method according to claim 6, wherein the determining, in the target corpus text, the one or more insertion positions includes:

inputting the target corpus text into an extra word position determination model to obtain the one or more insertion positions, and the predicting the respective one of the one or more extra words includes:

inputting the text located before the respective insertion position in the target corpus text into a preset extra word generation model to obtain the extra word.

8. A speech recognition text processing apparatus, comprising:

processing circuitry configured to:

acquire a target corpus text;

determine, in the target corpus text, one or more insertion positions for inserting one or more extra words that are semantically redundant to the target corpus text;

obtain a training corpus text that includes the one or more extra words inserted into the target corpus text at the one or more insertion positions;

obtain a set of labels corresponding to the training corpus text, the set of labels including at least one or more word removal labels corresponding to the inserted one or more extra words;

train an initial text processing model based on the training corpus text and the set of labels to obtain a text processing model;

acquire an original text obtained by speech recognition;

perform punctuation addition processing that is configured to add punctuation to the original text and numerical normalization processing that is configured to convert number words into numerals in the original text to determine a punctuation addition processing result and a numerical normalization processing result;

fuse the punctuation addition processing result and the numerical normalization processing result to obtain fused data;

perform, via the text processing model, word removal feature extraction on the original text based on an added punctuation of the punctuation addition processing and the numerals of the numerical normalization processing to determine a word removal feature, the word removal feature extraction being configured to identify at least one spoken word determined to be semantically redundant; and perform word removal processing on the intermediate result of the original text through an attention interaction layer based on the word removal feature and the fused data to determine a processed text of the original text.

9. The apparatus according to claim 8, wherein the processing circuitry is further configured to:

convert a speech numerical format in the original text into written numerical format.

10. The apparatus according to claim 8, wherein the processing circuitry is further configured to:

perform attention interaction on the fused data and the word removal feature to determine an interaction feature; and generate the processed text of the original text based on the interaction feature and the word removal feature.

11. The apparatus according to claim 8, wherein the processing circuitry is further configured to:

filter punctuations in the target corpus text to obtain a first intermediate corpus text; and sequentially label the first intermediate corpus text based on a punctuation type and a punctuation position of each punctuation in the target corpus text and based on a preset punctuation label dictionary to obtain punctuation labels to be included in the set of labels.

12. The apparatus according to claim 8, wherein the processing circuitry is further configured to:

convert a number in a numeric form in the target corpus text into a number word form to obtain a second intermediate corpus text; and sequentially label the second intermediate corpus text based on a position of the number in the numeric form in the target corpus text and based on a preset number normalization label dictionary to obtain numerical normalization labels to be included in the set of labels.

13. The apparatus according to claim 8, wherein the processing circuitry is further configured to:

predict, for each of the one or more insertion positions, the respective one of the one or more extra words based on a text located before the respective insertion position in the target corpus text.

14. A non-transitory computer-readable storage medium storing computer-readable instructions thereon, which, when executed by processing circuitry, cause the processing circuitry to perform a speech recognition text processing method comprising:

acquiring a target corpus text;

determining, in the target corpus text, one or more insertion positions for inserting one or more extra words that are semantically redundant to the target corpus text;

obtaining a training corpus text that includes the one or more extra words inserted into the target corpus text at the one or more insertion positions;

obtaining a set of labels corresponding to the training corpus text, the set of labels including at least one or more word removal labels corresponding to the inserted one or more extra words;

training an initial text processing model based on the training corpus text and the set of labels to obtain a text processing model;

acquiring an original text obtained by speech recognition;

performing punctuation addition processing that is configured to add punctuation to the original text and numerical normalization processing that is configured to convert number words into numerals in the original text to determine a punctuation addition processing result and a numerical normalization processing result;

fusing the punctuation addition processing result and the numerical normalization processing result to obtain fused data;

performing, via the text processing model, word removal feature extraction on the original text based on an added punctuation of the punctuation addition processing and the numerals of the numerical normalization processing to determine a word removal feature, the word removal feature extraction being configured to identify at least one spoken word determined to be semantically redundant; and performing word removal processing on the intermediate result of the original text through an attention interaction layer based on the word removal feature and the fused data to determine a processed text of the original text.

15. The non-transitory computer-readable storage medium according to claim 14, wherein the method further includes:

filtering punctuations in the target corpus text to obtain a first intermediate corpus text; and sequentially labeling the first intermediate corpus text based on a punctuation type and a punctuation position of each punctuation in the target corpus text and based on a preset punctuation label dictionary to obtain punctuation labels to be included in the set of labels.

16. The non-transitory computer-readable storage medium according to claim 14, wherein the method further includes:

converting a number in a numeric form in the target corpus text into a number word form to obtain a second intermediate corpus text; and sequentially labeling the second intermediate corpus text based on a position of the number in the numeric form in the target corpus text and based on a preset number normalization label dictionary to obtain numerical normalization labels to be included in the set of labels.

17. The non-transitory computer-readable storage medium according to claim 14, wherein the method further includes:

predicting, for each of the one or more insertion positions, the respective one of the one or more extra words based on a text located before the respective insertion position in the target corpus text.

18. The non-transitory computer-readable storage medium according to claim 17, wherein the determining, in the target corpus text, the one or more insertion positions includes:

inputting the target corpus text into an extra word position determination model to obtain the one or more insertion positions, and the predicting each of the one or more extra words includes:

inputting the text located before the respective insertion position in the target corpus text into a preset extra word generation model to obtain the corresponding extra word.

* * * * *